United States Patent [19]

Abraham et al.

[11] Patent Number: 5,291,593
[45] Date of Patent: Mar. 1, 1994

[54] SYSTEM FOR PERSISTENT AND DELAYED ALLOCATION OBJECT REFERENCE IN AN OBJECT ORIENTED ENVIRONMENT

[75] Inventors: Robert L. Abraham, Marietta, Ga.; Cynthia A. Ross, Boynton Beach, Fla.; Richard E. Moore, Marietta; William L. Rich, Stone Mountain; Floyd W. Shackelford, Buford; John R. Tiller, Jr., Peachtree City, all of Ga.; Richard S. Briggs, Jr., Bloomingdale, Ill.

[73] Assignee: International Business Machines Corp., Armonk, N.Y.

[21] Appl. No.: 602,575

[22] Filed: Oct. 24, 1990

[51] Int. Cl.$^5$ .......................... G06F 15/40; G06F 7/10
[52] U.S. Cl. ............................ 395/600; 364/DIG. 1; 364/246.3; 364/282.1; 364/282.3; 364/283.1; 364/284.3; 395/575; 395/157
[58] Field of Search ..................... 364/300, 200, 513, ; 395/800, 575, 650, 200 MS, 700 MS, 600 MS, 157

[56] References Cited

U.S. PATENT DOCUMENTS

| 4,445,177 | 4/1984 | Bratt et al. ........................ 395/800 |
| 4,558,413 | 10/1985 | Schmidt et al. .................... 395/600 |
| 4,621,321 | 11/1986 | Boebert et al. ..................... 395/600 |
| 4,660,142 | 4/1987 | Clancy et al. ...................... 395/400 |
| 4,701,840 | 10/1987 | Boebert et al. ..................... 395/800 |
| 4,853,842 | 8/1989 | Thatte et al. ....................... 395/425 |
| 4,885,714 | 12/1989 | Eisenstein et al. ............. 364/709.01 |
| 4,953,080 | 8/1990 | Dysart et al. ...................... 364/200 |
| 4,972,343 | 11/1990 | Iwamoto ............................. 364/513 |
| 4,989,132 | 1/1991 | Wellender et al. ................. 364/200 |
| 5,095,522 | 3/1992 | Fujita et al. ....................... 395/200 |
| 5,125,091 | 6/1992 | Staas, Jr. et al. .................. 395/600 |
| 5,151,987 | 9/1992 | Abraham et al. .................. 395/575 |

FOREIGN PATENT DOCUMENTS 61-82232 4/1986 Japan .
61-123953 6/1986 Japan .

OTHER PUBLICATIONS

Straw et al, Object Management in a Persistent Small Talk System, Software Practice & Experience, pp. 719-737, Aug. 1989, vol. 19, No. 8.
Kim et al, Architecture of the Orion Next-Generation Database System, IEEE Transactions on Knowledge and Data Engineering, vol. 2, No. 2, Mar. 1990.
"General-Purpose Memory Allocation Interface", by A. D. Hooten and J. A. Roberts, IBM TDB, vol. 30, No. 12, May 1988, p. 280.
"Generate Unique and Recoverable Object Identifier," by Wierbowski, IBM TDB, vol. 32, No. 6B, Nov. 1988, pp. 112-115.

Primary Examiner—Paul V. Kulik
Assistant Examiner—Wayne Amsbury
Attorney, Agent, or Firm—John J. Timar; Lauren C. Bruzzone

[57] ABSTRACT

A data structure and method for uniquely identifying, and optimizing access to, object instances in an object oriented programming environment on a data processor containing a memory. Objects are categorized into one or more classes which define the method of the categorized objects, and messages are sent by the data processor to objects to perform actions. The data structure consists of a persistent portion containing a unique object identifier and a non-persistent portion containing the access address of an instance data frame in memory. The access address is set to the address of the instance data frame control block when the message is sent in order to optimize subsequent messages to the same object instance. The instance data frame control blocks are not allocated in memory until a first message is sent to an instance.

5 Claims, 3 Drawing Sheets

SYSTEM FOR PERSISTENT AND DELAYED ALLOCATION OBJECT REFERENCE IN AN OBJECT ORIENTED ENVIRONMENT

CROSS-REFERENCE TO RELATED APPLICATION

The present application is related to a co-pending patent application entitled, "A Messenger and Object Manager to Implement an Object Oriented Environment" Ser. No. 602,442. These applications have a common assignee and contain some common disclosure.

BACKGROUND OF THE INVENTION

The field of the invention relates generally to an object oriented programming environment. More particularly, the invention relates to an Object Reference data structure that enables operation within an object oriented environment.

This section provides a brief description of object oriented computing system concepts which are pertinent to the present invention. A more detailed description of the concepts discussed in this section can be found in a number of references, including *Object-Oriented Systems Analysis* by Sally Shlaer and Stephen J. Mellor (Yourdon Press Computing Series, 1988), *Object Oriented Design With Applications* by Grady Booch (The Benjamin/Cummings Publishing Company, 1990) and *Object Oriented Software Construction* by B. Meyer, (Prentice Hall, 1988).

In object oriented programming systems (OOPS), "messages" are sent to "objects". There are two parts to a message. The parts are: (1) Object (2) Action. The object of the message simply identifies the piece of data that comprises a specific object, called an "instance". The action specifies what to do with that data.

In order to operate within an OOPS environment, it is necessary to have what is know as an Object Identification (OID) or Object Reference (OREF). The Object Reference is used to uniquely identify an object instance, which, in turn, allows messages to be forwarded to the object. Essentially, each object has a unique name. The Object Reference serves as a place holder for the unique name of a specific object.

The Object Reference Works in conjunction with an Object Manager and a Messenger, both of which are fundamental to an object oriented programming system, to ensure that messages are sent to the appropriate objects. The Object Manager's (OM) responsibility is to manage and keep track of all objects, whether stored in volatile memory (RAM) or in non-volatile persistent memory (called DASD or Direct Access Storage Device). Additionally, the Object Manager transparently provides data access indirection, memory management, a unit of work environment, and automatic materialization and dematerialization of persistent objects from the data base. The Messenger's responsibility is to see that every message is sent to the correct method code and that this method operates upon the correct object data. The appropriate method code for the message is determined by the messenger by using the action portion of the message.

Unlike conventional programming systems wherein emphasis is placed on methods to be conducted on data sets, in object oriented programming systems the concern is with real world objects. These real world objects have both attributes and actions to be performed on the attributes. An object is a data structure containing information about something of interest to the system and its users. Objects having similar characteristics and common behavior are instance objects of the class. In summary, instance objects contain information about things in the system and class objects contain information about instance objects. Class objects contain information that is global to all instances of a single class.

SUMMARY OF THE INVENTION

It is an object of this invention to provide a object reference system for use in an object oriented programming environment that can uniquely identify an instance whether the instance is in memory or in a database.

It is another object of this invention to provide a object reference system that can be examined to automatically and transparently materialize objects from the database into memory.

It is a further object of this invention to provide a object reference system that optimizes access to object instances.

These and other objects and advantages are accomplished by the present invention in which each object in an object oriented programming environment is identified by a data structure called an Object Reference. The structure for an Object Reference consists of a persistent portion containing the unique object ID and a non-persistent portion containing the access address of an instance data frame in memory. The object ID has type, class identification, and instance identification fields. The access address is set to the actual address of the data frame when the message is sent and is used to optimize subsequent messages to the same object instance.

In the present invention a number of Object Reference types have been identified including class type, instance type, slot type, and uncreated instance type. The access address is a pointer to an instance data frame control block within an Object Management Table which keeps track of all instance frames currently in memory. The Object Management Table can function as an object itself, having methods to add, delete and locate entries for all other objects, and having location data for its data attributes. The access address is not used until the type field indicates that an Object Reference is an instance reference type. The access address is set at instance create time. The access address is reset during message calls and is used to optimize data frame lookup within the Object Management Table. Objects are read into memory automatically, if not already in memory, when actually invoked by an Object Reference. However, unused references do not cause the underlying object to be read into memory. Instance data frame control blocks are not allocated until the very first message for any particular object ID is received. This allows a virtually unlimited number of Object References to be declared within the object oriented programming system while only maintaining service for those actually in use.

A better appreciation of these and other advantages and features of the present invention, as well as the manner in which the present invention realizes them will be gained from the following detailed description and accompanying drawings of the preferred embodiment, and from the claims.

DETAILED DESCRIPTION OF THE PREFERRED EMBODIMENTS

The purpose of the Object Reference is to uniquely identify an object instance, regardless of whether it is located in memory or in the database. The Object Reference operates with instances in either location. The Object Reference, operating with an Object Manager and Messenger in an object oriented programming system, allows objects to be automatically materialized into memory when they are actually invoked. Before describing the structure and examples of use of the Object Reference, an overview of an object oriented environment and the operation of its principal interrelated components, Object Reference, Object Manager and Messenger, is presented.

Figure 1:
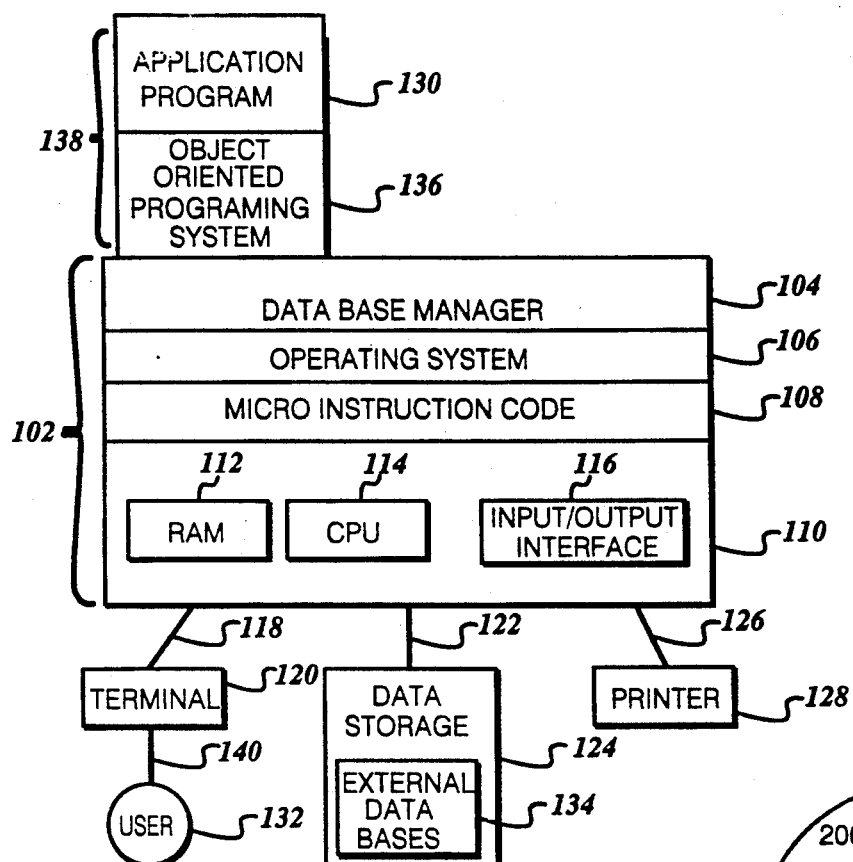
FIG. 1 illustrates an object oriented programming environment in connection with the present invention.

As shown in FIG. 1, an object oriented programming environment contains a computer program 138 which operates on a computer platform 102. The computer program 138 includes an application program 130 and an object oriented programming system 136.

The computer platform 102 includes hardware units 110 including a central processing unit (CPU) 114, a main memory (RAM) 112, and an input/output interface 116.

The computer platform 102 also includes microinstruction code 108, an operating system 106, and a database manager 104. Various peripheral components may be connected to the computer platform 102, such as a terminal 120, a data storage device 124, and a printing device 128. The data storage device or secondary storage 124 may include hard disks and tape drives. The data storage device 124 represents non-volatile storage. External databases 134 are stored on the secondary storage 124. In object oriented programming systems the operating system uses virtual memory and manages all paging.

Users 132 interact with the computer platform 102 and the computer program 138 via terminal 120.

In a preferred embodiment of the present invention, the computer platform 102 includes a computer having an IBM System 370 architecture. The operating system 106 which runs thereon is an IBM Multiple Virtual Storage (MVS). The database manager 104 is an IBM DB2, which is a relational database manager. Also, the computer program 138 is preferably written in Intermediate C, which is an object oriented dialect of the C computer programming language. Intermediate C is similar to the C++ computer programming language.

Figure 2:
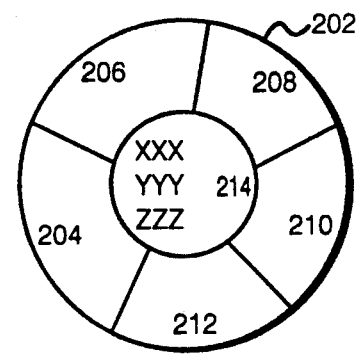
FIG. 2 illustrates a graphical representation of an object in connection with the present invention.

FIG. 2 presents a graphical representation of an object 202. The object 202 contains data 214 (also called attributes) and the actions 204, 206, 208, 210, 212 (also called methods). Generally, methods are categorized as functions or procedures. A function is a type of code that will return a result. Normally a function tends not to modify the state of the parameters given.

As shown in FIG. 2, the object 202 is modeled by a doughnut, with the data 214 being in the center of the doughnut. The data 214 represent various attributes of the object 202. The color of one's eyes, date of birth, name, etc., could be attributes of an object representing a person. Around the outer part of the doughnut, are the actions (also called methods) 204, 202, 208, 210, 212 to be performed on the data 214.

Object oriented programming systems categorize objects into classes. Thus, a class defines the features of its objects. A feature is either a method or an attribute. Features can be either exported, i.e., other methods can call them, or features can be non-exported, i.e., they can not be called except by a within-class method. An instance is a specific object with the features defined by its class.

An object has an arbitrarily unique value when using the example of doughnuts representing objects of the same type of class. The outer part of the doughnuts which represent the actions or functions of the instance objects are arranged identically for each of the objects in the particular class. Similarly, the data in the inside of the doughnuts is identically structured. Therefore, if two objects are of the same type, their structures are identical except for the actual data or attribute values.

The functions or actions to be performed on the data totally surround the data and in a sense encapsulate the data. Conventionally, the only programming that is allowed to know anything about the data are the functions or the routines in the outer part of the doughnut. This form of data encapsulation is not exclusive to object oriented programming. The basic idea behind data encapsulation is to minimize the number of system pieces that one must understand to form a particular set of data attributes.

The functions encapsulating a specific object are the only elements that know or care what the encapsulated data looks like. The functions isolate the encapsulated data from other parts of the system. Therefore one ends up with ultimate flexibility over time to change the data of an object in any desired fashion. Optimally, one is capable of modifying the system as technologies change, by merely changing the data. Alternatively, the product is portable. It can be moved from a relational data base to a hierarchical data base, or to a PC having no particular data base at all. A user is only required to change pieces of the internal data. An object only needs to be concerned about how it represents the data for which it is responsible. This is fundamental to an object oriented environment, since it is a large, portable software product.

Figure 3:
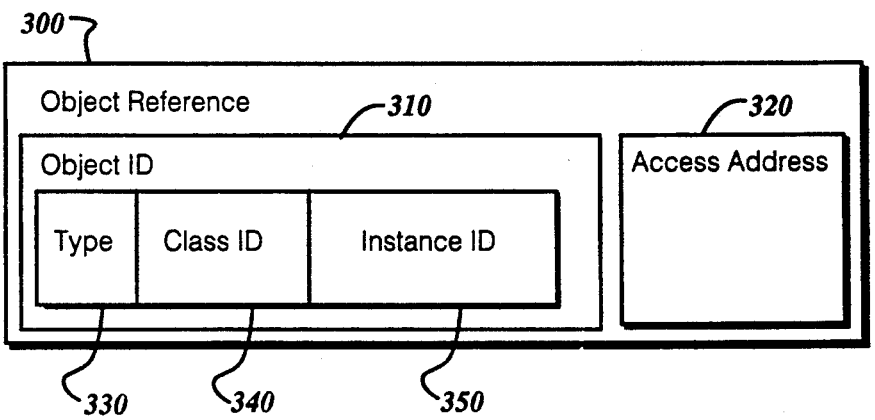
FIG. 3 illustrates the data structure of the Object Reference of the present invention.

The Object Reference defined for use within an object oriented programming environment is a data structure as shown in FIG. 3. Object Reference 300 represents the pointer to an arbitrary object within the object oriented programming environment. By comparison, C uses the address of a piece of data as the pointer to the beginning memory location of that data, and stores this address in a variable of type pointer. An object oriented programming system also uses a pointer to each piece of data, which is called an object, and stores this pointer in a variable called an Object Reference (OREF) 300.

The OREF 300 consists of a non-volatile portion, the object ID 310 and a volatile portion, the access address 320. The object ID 310 represents the non-volatile identity of the object referred to by the OREF 300 and is an arbitrary and unique identifier composed of a type, class ID, and instance ID fields.

The type field 330 identifies the type of the Object Reference and helps the Messenger to resolve the OREF access address 320. Type field 330 indicates the static and dynamic characteristics of the OREF 300. The class ID field 340 identifies the particular class of objects for which OREF 300 is a reference. The instance ID field 350 uniquely identifies each instance data frame. Each instance data frame must be assigned a unique instance identifier to determine its location either in main memory 112 or in data base 134.

Access address 320 represents the address of the instance data frame in memory 112. It can be either the direct address of the instance data frame in memory 112, or it can be an indirect address that references other data structures that point to the object instance. Access address 320 is initialized to a null value and is set when the first message using OREF 300 is sent to an object.

Object oriented programming systems are message based systems. Objects invoke or ask other objects to perform an action. A message is an object/action pair with the following format: OBJ@ACTION; the left side of the message operator identifies a specific "object" and is an object reference 300, and the right side specifies what "action" is to be performed on, or with the object. The "@" symbol represents a message operator in intermediate C. If the action is a functional procedure which requires parameters, the syntax of the message object and action will also be followed by a parameter or string of parameters offset by parentheses and separated by commas.

The message is essentially a call. Conceptually, it is a call to a part of the object or into the enabling system called a Messenger. A Messenger's job is to deliver a request to other objects. The system will essentially see a call to the Messenger which will find out where this particular object is located. In this illustration the Messenger will essentially pass the call on to that object.

The Object Manager (OM) must resolve both sides of the message operator. It is the Messenger's job using the Object Reference data structure to find the correct piece of code, otherwise known as a method, and to find the correct block of data, otherwise known as a data frame. The action is a segment of code, and the object actually identifies a block of data.

The preferred embodiment of the Object Manager and Messenger is covered in co-pending, commonly owned application Ser. No. 602,442, filed Oct. 23, 1990, and entitled, "A Messenger and Object Manager to Implement an Object Oriented Environment", the disclosure of which is incorporated herein by reference.

Class objects are managed by a Loaded Classes Table (LCT). Instance objects are managed by an Object Management Table (OMT). Object References are pointers used to point to class objects and instance objects. Class objects and instance objects are referred to as frames and are not directly manipulated except by the methods which operate on them.

Figure 4:
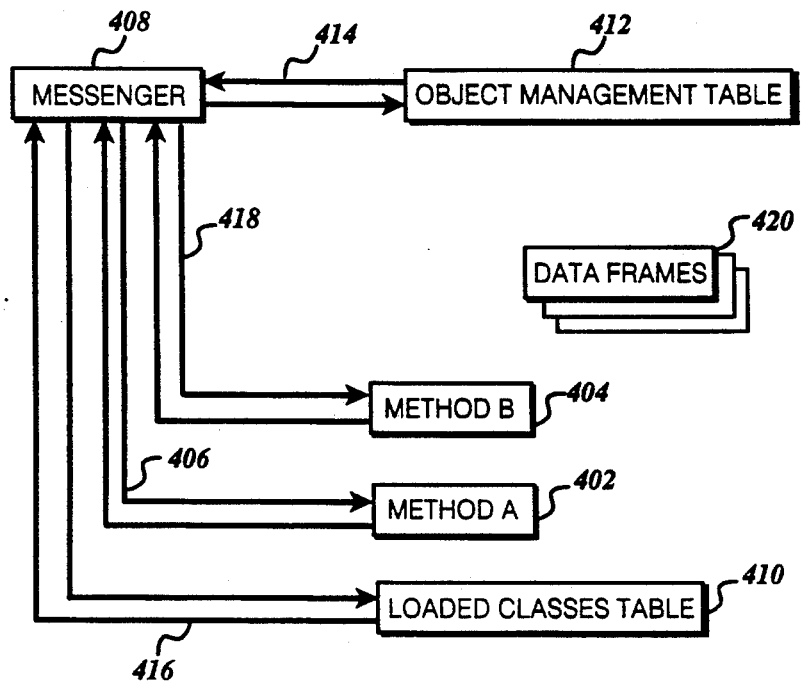
FIG. 4 illustrates a messaging system used in connection with the present invention.

The flow for the invocation of an instance method depicted at FIG. 4 may yield a better understanding of the roles that the Object Reference, Object Manager and Messenger play in implementing the object oriented environment.

More specifically, method A of some instance 402 sends a message to method B of some instance 404, which results in a call 406 to the Messenger 408. The Messenger 408 must resolve class and default instance data addresses by calling the Loaded Classes Table (LCT) 410. The LCT keeps track of those classes which have already been loaded into memory. Classes are not loaded until they are referenced. They are then left in memory for the duration of the session. If the class of instance 402 has not been loaded, the LCT 410 will load it at this time and then call the class to materialize its data. For purposes of the following discussion, assume that the instance's class has already been loaded and control is returned to the Messenger.

If the object is an instance, the Messenger asks the Object Management Table (OMT) 412 for an indirection pointer to the data frame of the instance object specified by the message. The Object Manager searches the entries in Object Management Table 412 for a matching object ID. If the instance object is located in the table, the OMT 412 returns the indirection pointer to the instance object, as shown by arrow 414. Otherwise, if this search does not resolve the matching object, and if it is a persistent object, a frame will then be allocated in memory to hold the persistent data. This new object's class is called to materialize its data from the database. If the object is not located in the database, then it does not currently exist and an error condition is signalled.

Object References may be either resolved or unresolved. As noted above, the Object Reference comprises the object id which identifies the object. The Object Reference also comprises an access address. The access address is set to point to the correct entry in the OMT the first time the Object Reference is used to send a message. It is then called "resolved". Once an Object Reference is resolved, no further searching for the object id is needed. However, the Object Manager ensures that the object ID in the OMT entry matches the object ID of the Object Reference.

The Messenger 408 calls the LCT 410 for the address of the method specified by the message. At the same time, it establishes the class and default instance data offsets for the method so that it can access the correct data within the object. The LCT 410 searches the classes for the specified method and returns the address of the method to the Messenger as depicted by arrow 416.

Using the address just received from the LCT 410, the Messenger 408 will call Method B 404 as shown at arrow 418, passing it a system data area and the parameters from the call made by Method A. The system data area has, among other things, the indirection pointer returned by the OMT 412.

For example, if Method B is an instance method, it will access data frame 420 using the indirection pointer which points to the data through an entry in the OMT 412. Alternatively, if it is a class method it will be accessing the class data and the default instance data.

Figure 5:
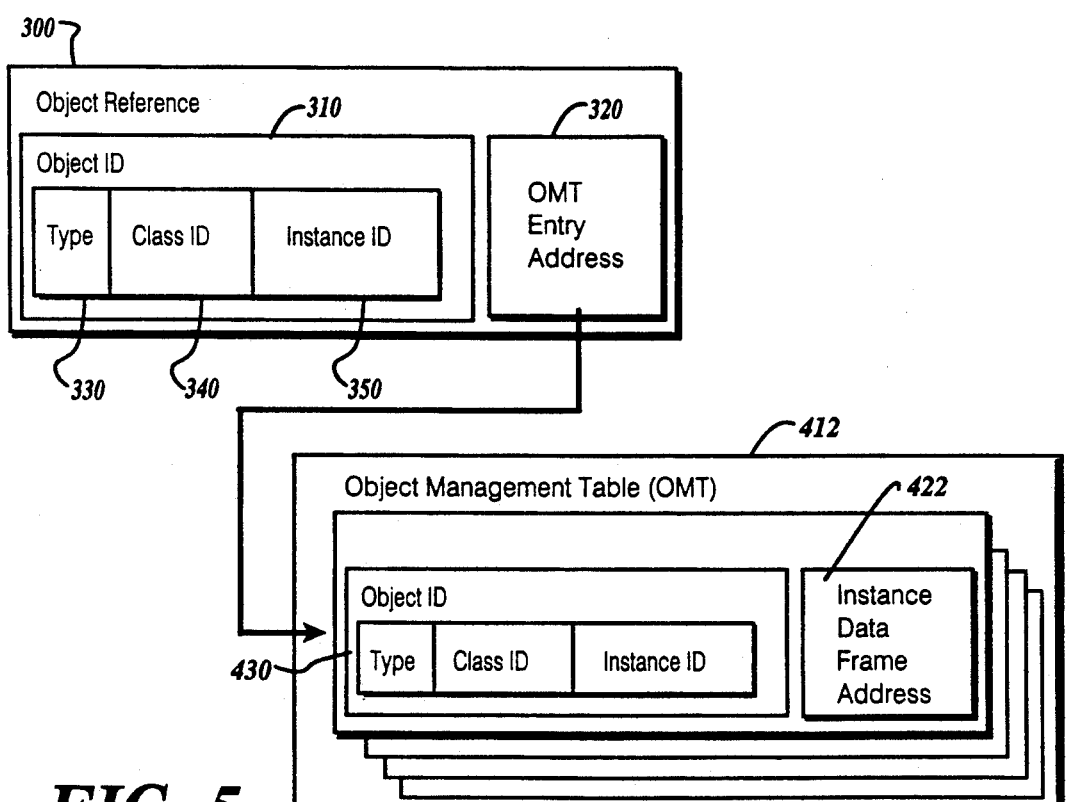
FIG. 5 illustrates a preferred implementation of the Object Reference of the present invention.

In the preferred implementation of the Object Reference 300, shown in FIG. 5, the Access Address 320 is in actuality a pointer to an instance data frame control block within the Object Management Table 412. However, the access address 320 is not used until the type field 330 indicates that OREF 300 is an address of an reference type.

The type field 330 in this preferred implementation can be utilized to represent a class type, a created instance type, a slot object type, or an uncreated instance type. These types can be extended as necessary to include others. A class type is an object ID to a class data frame. The instance ID portion can be ignored for a class type object ID. A created instance type is an object ID to an instance data frame. An uncreated instance type is an object ID to an uncreated instance. Uncreated means that the instance ID portion 350 of the object ID 310 does not as yet identify any instance. This is similar to having a null pointer in the C programming language.

The instance ID field 350 consists of a network ID, a node ID, and a date/time stamp, the total field size being 24 bytes.

Object Management Table 412 contains entries having an object ID 430 and an instance data frame address 422. Instance data frame address 422 points to locations of instance data frames in memory 118.

To further amplify the manner in which the Object Reference 300 is used within an object oriented programming environment, three typical situations are described below. The first situation, depicted in FIG. 6, occurs when the Object Reference 300 represents a reference to an uncreated object. In the second situation, depicted in FIG. 7, the Object Reference 300 is unresolved, and in the final situation, depicted in FIG. 8, the Object Reference 300 is resolved.

Figure 6:
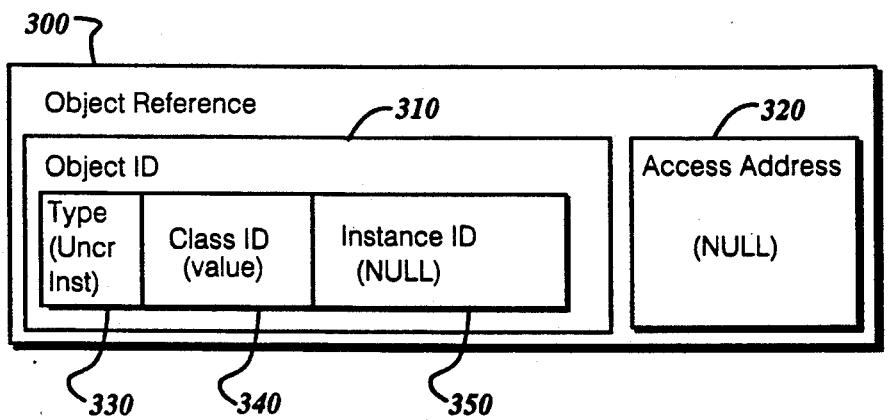
FIG. 6 illustrates the contents of the Object Reference for an uncreated object instance in connection with the present invention.

When the Object Reference 300 is to a frame object that does not exist, the OREF 300 is used as a parameter to the Create method of the class for which an instance is to be created. The Object Manager recognizes this situation by examining the object ID 310 of OREF 300. As shown in FIG. 6, the type field 330 identifies the type as uncreated instance, the class ID field 340 identifies the class for which an instance is to be created, and the instance ID field 350 contains a null value. Access address 320 also contains a null value. Once the object instance is created, the Object Manager alters the Object Reference 300 by (1) adding the instance identifier for the newly created object to the instance ID field 350, (2) adding the address of the object's frame to the access address 320, and (3) changing the type field 330 to be the "instance" type. Correspondingly, the Object Manager adds an entry to Object Management Table 412 for the new object. At this point, Object Reference 300 would be a "resolved" Object Reference.

Figure 7:
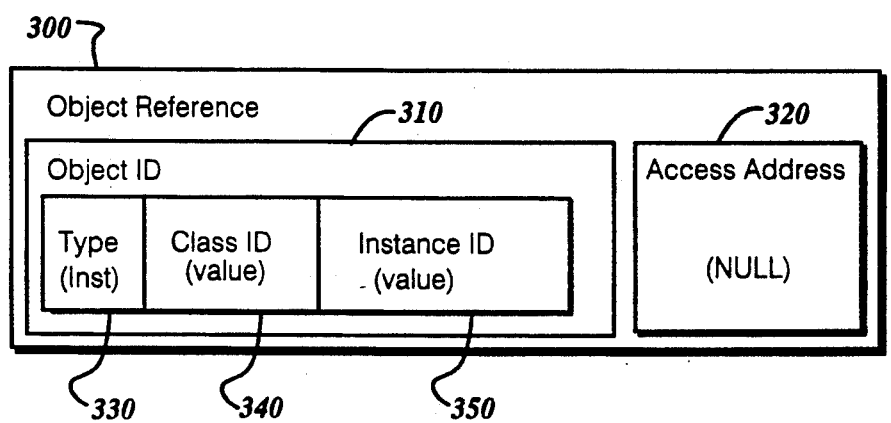
FIG. 7 illustrates the contents of the Object Reference for an unresolved Object Reference in connection with the present invention.

In the situation shown in FIG. 7 where Object Reference 300 is unresolved (i.e., the access address contains a null value), an object that currently exists in memory 112 or in database 134 is referenced for the first time using this particular OREF. Such Object Reference 300 is likely to be a data attribute within some other persistent object that has saved the object ID, but has not yet resolved the access address 320, or that is being referenced by an "old" object reference whose access address 320 is no longer accurate and has been reset to null.

This situation is handled in the preferred implementation by using the Object Reference 300 as the object portion of any message to an instance method of another object. The Object Manager starts the processing by examining the access address 320 of the OREF 300. As indicated in FIG. 7, the access address 320 contains a null value, which means the Object Manager will have to search for the Object. The Object Manager uses the object ID portion 310 of the reference to search Object Management Table 412 to determine if the frame of the referenced object is currently in memory 112. If an entry is found in Object Management Table 412, the Object Manager updates the access address 320 with the proper pointer (either direct or indirect depending upon implementation), and delivers the message to the correct object method.

If the referenced object is not currently in memory 112, and thus has no entry in Object Management Table 412, the Object Manager uses the class ID field 340 of object ID portion 310 of the OREF to determine its next action. The class ID 340 will indicate whether the class of the object is persistent, and consequently, whether or not the object might be stored persistently on a database 134. When the class ID 340 indicates the class of the object is non-persistent, meaning that its objects are never stored on database 134, the referenced object does not exist and an error condition is signalled according to implementation. The preferred method of implementation is a program exception. However, if the class ID 340 indicates that the class of the object is persistent, meaning that its objects may be stored in database 134, the referenced object may exist, but simply not be currently resident in memory 112. In this case, the class ID 340 is further used to allocate an empty frame for the instance in memory 112, and send a message to the materialize method of this new frame instance to fill in the actual instance data. If the materialize method is successful, the Object Manager adds an entry to Object Management Table 412 for this newly fetched, but previously existing, object, and delivers the message to the correct object method. The Object Manager also updates access address 320, thus making the Object Reference resolved. On the other hand, if the materialize request is unsuccessful, the referenced object does not exist either in memory 112 or in the database 134. An error condition is signalled as described above.

Figure 8:
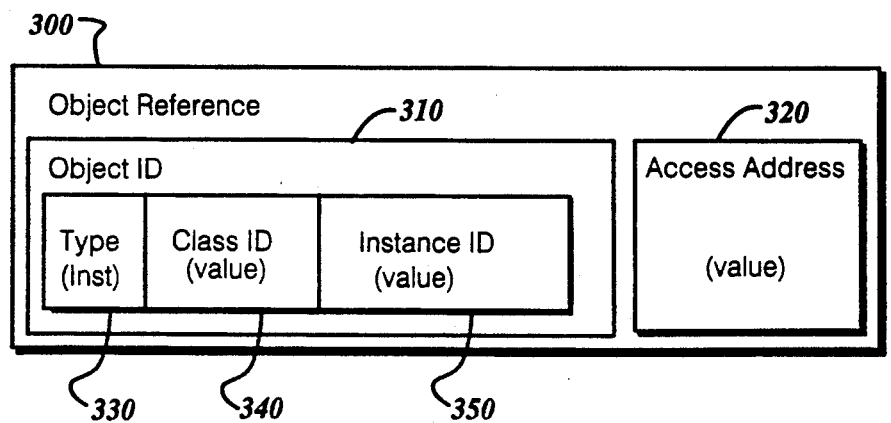
FIG. 8 illustrates the contents of the Object Reference for a resolved Object Reference in connection with the present invention.

The final situation considered is shown in FIG. 8 where Object Reference 300 has previously been resolved. This occurs when the referenced object currently exists and has been previously referenced using this particular OREF 300. For example, this may be the same OREF 300 that was initialized by the Create method described above in conjunction with the discussion of references to uncreated objects. In this case, the OREF 300 is used as the object portion of any message to an instance method of another object.

The Object Manager begins by examining the access address 320 of the OREF 300. Since the access address 320 does not contain a null value, the Object Manager attempts to validate the access address. It does this by comparing the object ID portion 310 of the OREF 300 against the object ID that is in the Object Management Table 412. In other embodiments, the object ID can be contained in the instance frame. If the access address 320 is implemented as an indirect address to an entry in Object Management Table 412 that points to the actual instance frame, then the validating object ID can be held either in the OMT entry or in the frame itself. When the object ID portion 310 of the OREF 300 matches the validating object ID, the access address 320 is used and no further search for the object is needed. However, if the object ID portion 310 of the OREF 300 does not match the validating object ID, the access address 320 is treated as though it had never been resolved, and is set again to a null value. Processing then continues as described above for an unresolved Object Reference.

While the invention has been particularly shown and described with respect to the particular embodiment thereof, it will be understood by those skilled in the art that various changes in form and details may be made therein without departing from the spirit and scope of the invention.

Having thus described our invention, what we claim and desire to secure by letters patent is as follows:

1. In an object oriented computing environment operating on a data processor containing a main memory and having a direct access storage device for persistently storing data objects, in which a plurality of data objects are categorized into one or more classes which define methods of the categorized classes, and in which messages containing an object reference data structure are sent by the data processor to at least one object to perform at least one action upon said object, said object reference data structure having an object type field, an object class identification field, an object instance identification field and an access address field, a method for handling uncreated objects comprising the steps of:

creating an object instance in main memory for the uncreated object and inserting an entry in an object management table identifying the location of the object instance in main memory; and altering the contents of said object reference data structure to identify the object instance as being of created instance type, adding an object instance identifier in the object instance identification field for the newly created object instance, and modifying the access address field to refer to the entry for the newly created object in the object management table.

2. In an object oriented computing environment operating on a data processor containing a main memory and having a direct access storage device for persistently storing data objects, in which a plurality of data objects are categorized into one or more classes which define methods of the categorized classes, and in which messages containing an object reference data structure are sent by the data processor to at least one object to perform at least one action upon said object, said object reference data structure having an object type field, an object class identification field, an object instance identification field and an access address field, a method for handling unresolved object references comprising the steps of:

searching an object management table using the object instance identification field of said object reference data structure to determine if there is an entry pointing to an object instance for the referenced object in main memory;

if an entry is found in said object management table for the referenced object, updating the access address field in the object reference data structure so that it points to said object instance for the referenced object;

if an entry for the referenced object is not found in said object management table, examining the object class identification field of said object reference data structure to determine if the referenced object is persistent;

if the referenced object is persistent, allocating an empty instance frame in main memory for the referenced object and sending a request to a materialize method of the referenced object to fetch the referenced object from the direct access storage device to main memory; and adding an entry to the object management table for the fetched referenced object if it is successfully fetched.

3. The method of claim 2 including the signalling of an error condition to said data processor and executing an error handling routine if said examining of said object class identification field of said object reference data structure indicates that the referenced object is not persistent and therefore is not stored on the direct access storage device.

4. The method of claim 2 including the signalling of an error condition to said data processor and executing an error handling routine if the request sent to the materialize method of the referenced object does not result in the successful materialization of the referenced object from the direct access storage device.

5. In an object oriented computing environment operating on a data processor containing a main memory and having a direct access storage device for persistently storing data objects, in which a plurality of data objects are categorized into one or more classes which define methods of the categorized classes, and in which messages containing an object reference data structure are sent by the data processor to at least one object to perform at least one action upon said object, said object reference data structure having an object type field, an object class identification field, an object instance identification field and an access address field, a method for handling resolved object references comprising the steps of:

validating the access address field of the object reference data structure by comparing the object type field, the object class identification field, and the object instance identification field of said object reference data structure with corresponding data field entries in the object management table to find a match;

if an entry is found in the object management table that matches the object type field, the object class identification field, and the object instance identification field of said object reference data structure, using the access address field of said matching object management table entry to identify the location in main memory of said referenced object; and if no entry is found in the object management table that matches the object type field, the object class identification field, and the object instance identification field of said object reference, setting the access address field of said object reference data structure to a null value and invoking a procedure to further handle the referenced object as an unresolved object reference.

* * * * *